Dec. 13, 1966  W. J. EGGINGTON  3,291,238
AIR CUSHION BORNE VEHICLES
Filed Feb. 21, 1964

Inventor
Wilfred James Eggington
By
Pennie, Edmonds, Morton, Taylor and Adams
Attorneys

United States Patent Office 3,291,238
Patented Dec. 13, 1966

3,291,238
AIR CUSHION BORNE VEHICLES
Wilfred James Eggington, Buffalo, N.Y., assignor to Vickers-Armstrongs (Engineers) Limited, London, England, a British company
Filed Feb. 21, 1964, Ser. No. 346,544
Claims priority, application Great Britain, Apr. 24, 1963, 16,202/63
7 Claims. (Cl. 180—7)

This invention relates to air cushion borne vehicles.

According to the present invention there is provided a vehicle that is adapted to be supported at least partially by an air cushion, the vehicle having a skirt depending from the underside of the vehicle body to constitute a side wall of a space arranged to be supplied with air to form the cushion, the skirt being of inflatable form and having inner and outer walls, the space between these walls being arranged to be supplied with air to inflate the skirt, and there being an outlet at the bottom of the skirt to permit escape of air from the last-mentioned space.

Figure 1:
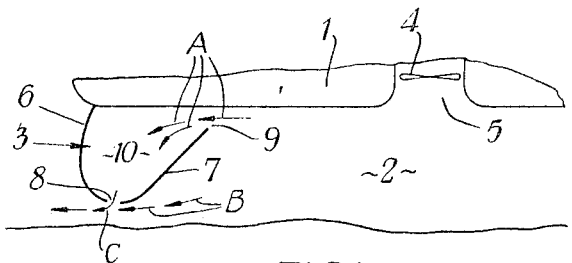
Figure 2:
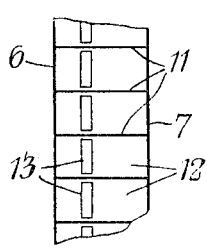
Figure 3:
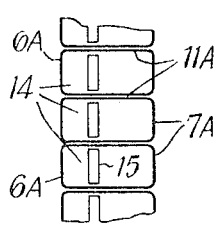
Figure 4:
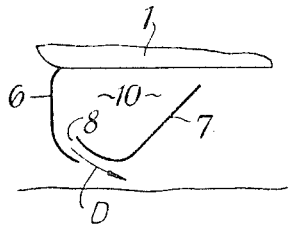
Figure 5:
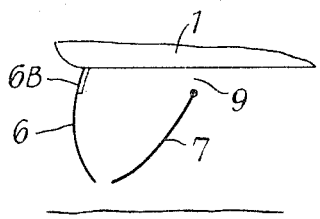
Figure 6:
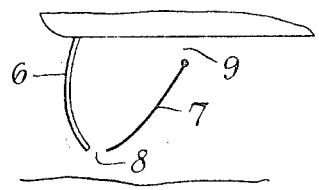
Figure 7:
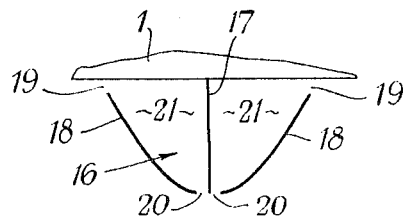

For a better understanding of the invention and to show how the same may be carried into effect reference will now, by way of example, be made to the accompanying drawing, in which:

FIGURE 1 is a diagrammatic sectional elevation of part of an air cushion borne vehicle having a skirt for encircling the air cushion, FIGURE 2 is a diagrammatic sectional plan view of a modified form of skirt for the vehicle of FIGURE 1, FIGURE 3 is a view similar to FIGURE 2 showing another modified form of skirt, FIGURES 4, 5 and 6 are diagrammatic sectional elevations of parts of different modified forms of the vehicle of FIGURE 1, and FIGURE 7 is a diagrammatic sectional elevation of a skirt that may be employed within the cushion of the vehicle of FIGURE 1.

The air cushion borne vehicle of FIGURE 1 has a body 1 beneath which there is a space 2 encircled by a skirt 3 depending from the underside of the periphery of the vehicle body 1. The space 2 is arranged to be supplied with air from a compressor 4 via an opening 5 in the central part of the underside of the body 1, so that a vehicle supporting air cushion is formed in the space 2. The vehicle is thus of the plenum chamber kind.

The skirt 3 is of lightweight inflatable form, being shown in FIGURE 1 in its inflated condition. The skirt has an outer thin flexible wall 6 the upper edge of which is secured to the underside of the periphery of the body 1, and an inner thin flexible wall 7 which extends inwardly and upwardly from the lower edge of the outer wall 6. An outlet 8 is formed between the lower edges of the walls 6 and 7 and this outlet may consist of a single slot or a plurality of holes spaced at intervals along the underside of the skirt. A gap 9 is formed between the upper edge of the wall 7 and the underside of the body 1. Ties (not shown) are provided for securing the upper edge of the wall 7 to the underside of the body 1. If desired the ties may be replaced by a rigid framework secured to the underside of the vehicle body and maintaining the upper edge of the wall 7 spaced from the underside of the vehicle body.

In operation of the vehicle of FIGURE 1 air is supplied to the space 2 below the underside of the body 1 by the compressor 4 to form the air cushion. Air from the cushion flows, as indicated by the arrows A, via the gap 9 into the space 10 that is between the walls 6 and 7 to inflate the skirt 3. Air leaks laterally from the cushion in the space 2, beneath the underside of the skirt 3 as indicated by the arrows B. Air escapes from the space 10 via the outlet 8 as indicated by the arrows C, such escape of air impeding leakage beneath the skirt 3 of air from the cushion in the space 2.

The central opening 5 mentioned above may be replaced by a longitudinal row of circular holes in the underside of the vehicle body, or by a longitudinal slot, or by two slots intersecting at right-angles.

In the modification illustrated in FIGURE 2 the walls 6 and 7 are secured together at intervals along the length of the skirt by vertical webs 11 of thin flexible material. The upper edges of the webs 11 may or may not be secured to the underside of the body 1. The space 10 is divided by the webs 11 into compartments 12. The outlet 8 is constituted by a series of rectangular shaped apertures 13 one in each compartment 12. In the modification of FIGURE 3, the skirt 3 is formed of a plurality of individual inflated elements 14 each having an outer wall part 6A, an inner wall part 7A and two web parts 11A joining the parts 6A and 7A. The parts 6A constitute the outer wall 6 and the parts 7A constitute the inner wall 7. Each individual inflated element 14 has a rectangular shaped aperture 15 at the bottom thereof, the apertures 15 together constituting the outlet 8. Adjacent elements 14 are ordinarily in contact with each other to minimise leakage between adjacent elements 14 of air from the cushion in the space 2. According to the modification of FIGURE 4 the bottom portions of the walls 6 and 7 are shaped to cause air escaping downwardly through the outlet 8 to be directed inwardly as indicated by the arrow D.

FIGURE 5 shows a modification in which the upper portion of the flexible wall 6 is replaced by a rigid wall part 6B and the upper edge of the wall 7 is rigidly spaced from the underside of the body 1 by a framework (not shown). The vertical extent of the wall part 6B is the same as the distance between the upper edge of the wall 7 and the underside of the body 1. In the modification of FIGURE 6 the wall 6, although being flexible, is considerably stiffer than the wall 7. The stiffness may be imparted to the wall 6 by making it thicker than the wall 7, or spaced vertical stiffening elements may be secured to, or formed integral with, the wall 6 at intervals along its length. Alternatively, the wall 6 may be of inflatable construction thereby to provide a wall that is stiffer than the inner wall 7.

FIGURE 7 illustrates a skirt 16 that may be provided on the underside of the body 1 of the vehicle of FIGURE 1 to compartment the cushion in the space 2. The skirt 16 has a central flexible membrane 17 that depends vertically from the underside of the body 1 and two inclined flexible membranes 18 on opposite sides of the membrane 17. The membranes 18 extend downwardly and towards the membrane 17. A gap 19 is formed between the upper edge of each membrane 18 and the underside of the body 1 whilst an outlet 20 is formed between the bottom edge of each membrane 18 and the adjacent bottom edge of the membrane 17. The gaps 19 correspond to the gap 9 of FIGURE 1 and the outlets 20 correspond to the outlet 8 of FIGURE 1. In operation the skirt 16 is inflated by air flowing from the cushion through the gaps 19 into the spaces 21 that are between the membranes 18 and the membrane 17. The air escapes from the spaces 21 downwardly via the outlets 20.

The various skirt constructions described above may be applied to a wheeled or tracked vehicle to enclose a cushion that assists in supporting the vehicle. Furthermore the various skirts may or may not extend completely around the periphery of the vehicle body and can be constructed so as to be readily detachable from and attachable to, the underside of the vehicle body.

I claim:

1. A vehicle that is adapted to be supported at least partially by an air cushion, the vehicle comprising a vehicle body having a space therebeneath in which the air cushion is formed and located, a skirt depending from the underside of the vehicle body to minimize leakage of air laterally from the air cushion in said space which is arranged to be supplied inwardly of the skirt with air for the cushion, said depending skirt being of inflatable form and having inner and outer walls, the inner wall extending in a direction downwardly and outwardly from the vehicle body, said walls defining a space therebetween arranged to be supplied at the top of the skirt with air from the air cushion to inflate the skirt, an air outlet at the bottom of the skirt permitting escape of air from said space between said inner and outer walls.

2. A vehicle according to claim 1, wherein an opening is formed between the upper edge of the wall adjacent the air cushion and the underside of the vehicle body through which opening air is supplied from the air cushion to the space between said walls.

3. A vehicle as claimed in claim 2, wherein said upper edge of the wall is spaced from the underside of the vehicle body, the upper part of the other wall being rigid over a length extending from the underside of the vehicle body to the level of said upper edge.

4. A vehicle as claimed in claim 1, wherein the bottom portions of the inner and outer walls are shaped with respect to each other to cause air escaping through said outlet to be directed downwardly and inwardly.

5. A vehicle as claimed in claim 1, wherein both inner and outer walls are constructed of flexible material, the outer wall being stiffer than the inner wall.

6. A vehicle as claimed in claim 1, and further comprising a further skirt for compartmenting the cushion, the further skirt including a central flexible membrane depending from the underside of the vehicle body and two further flexible membranes disposed on opposite sides of the central membrane and extending in a direction downwardly from the underside of the vehicle body towards the bottom of the central membrane, there being means allowing the spaces between the central membrane and the two further membranes to be supplied with air to inflate the compartmenting skirt, and there being outlets at the bottom of the further skirt to permit escape of air from the last-mentioned spaces.

7. A vehicle as claimed in claim 1, wherein the skirt is constructed to be detachable from and attachable to the underside of the vehicle body.

References Cited by the Examiner

UNITED STATES PATENTS 3,172,494  3/1965  Cockerell _____ 180—7

FOREIGN PATENTS 1,319,034  1/1963  France.

BENJAMIN HERSH, *Primary Examiner.*

A. HARRY LEVY, *Examiner.*

M. S. SALES, *Assistant Examiner.*